(12) United States Patent
Stokes et al.

(10) Patent No.: US 7,394,565 B2
(45) Date of Patent: Jul. 1, 2008

(54) SYSTEM AND METHOD FOR DYNAMICALLY CONTROLLING GAMUT MAPPING FUNCTIONS

(75) Inventors: Michael Stokes, Eagle, ID (US); Bradley P. Gibson, Seattle, WA (US); Christopher Raubacher, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 736 days.

(21) Appl. No.: 10/747,614

(22) Filed: Dec. 30, 2003

(65) Prior Publication Data

US 2005/0146734 A1 Jul. 7, 2005

(51) Int. Cl.
*H04N 1/60* (2006.01)

(52) U.S. Cl. .......................... 358/1.9; 358/518; 382/167

(58) Field of Classification Search ................. 382/162, 382/276, 167; 358/1.9, 518
See application file for complete search history.

(56) References Cited

U.S. PATENT DOCUMENTS

| | | | | |
|---|---|---|---|---|
| RE39,161 E * | 7/2006 | Edge et al. | ................... | 345/601 |
| 2001/0050757 A1* | 12/2001 | Yoshida et al. | ................. | 353/69 |
| 2002/0105660 A1* | 8/2002 | Haikin | ........................ | 358/1.9 |
| 2005/0100211 A1* | 5/2005 | Gibson et al. | ................ | 382/162 |
| 2007/0035751 A1* | 2/2007 | Presley et al. | ................. | 358/1.9 |

OTHER PUBLICATIONS

"Color Consistancy and the Adobe Creative Suite" White PAper, Adobe Systems Inc., Oct. 2003.*
"GIMP User's Manual" Karin Kylander et al. published by Coriolis Group, 1998.*
Fraser et al., Real World Color Management, 2003, pp. 88-92 and 179, Peachpit Press, Berkeley, CA.

* cited by examiner

*Primary Examiner*—Samir Ahmed
*Assistant Examiner*—Stephen R Koziol
(74) *Attorney, Agent, or Firm*—Birch, Stewart, Kolasch & Birch, LLP

(57) ABSTRACT

A method and system for controlling gamut mapping algorithm parameters and exposing those parameters as user interface elements to allow users to interactively control the gamut mapping algorithm parameters is provided. A request to modify a user interface is received and a modified gamut mapping algorithm parameter element is loaded into the user interface in response. The request to modify can be a request to modify a pre-existing gamut mapping algorithm parameter element or a format of a corresponding gamut mapping algorithm parameter. User specified requests to adjust gamut mapping algorithm parameter elements are received and color management operations are adjusted in response. A three dimensional representation of a device color gamut can be displayed and modified by a user, and an input image that is being processed by the color management operations is displayed and modified dynamically in response to user specific adjustments.

30 Claims, 14 Drawing Sheets

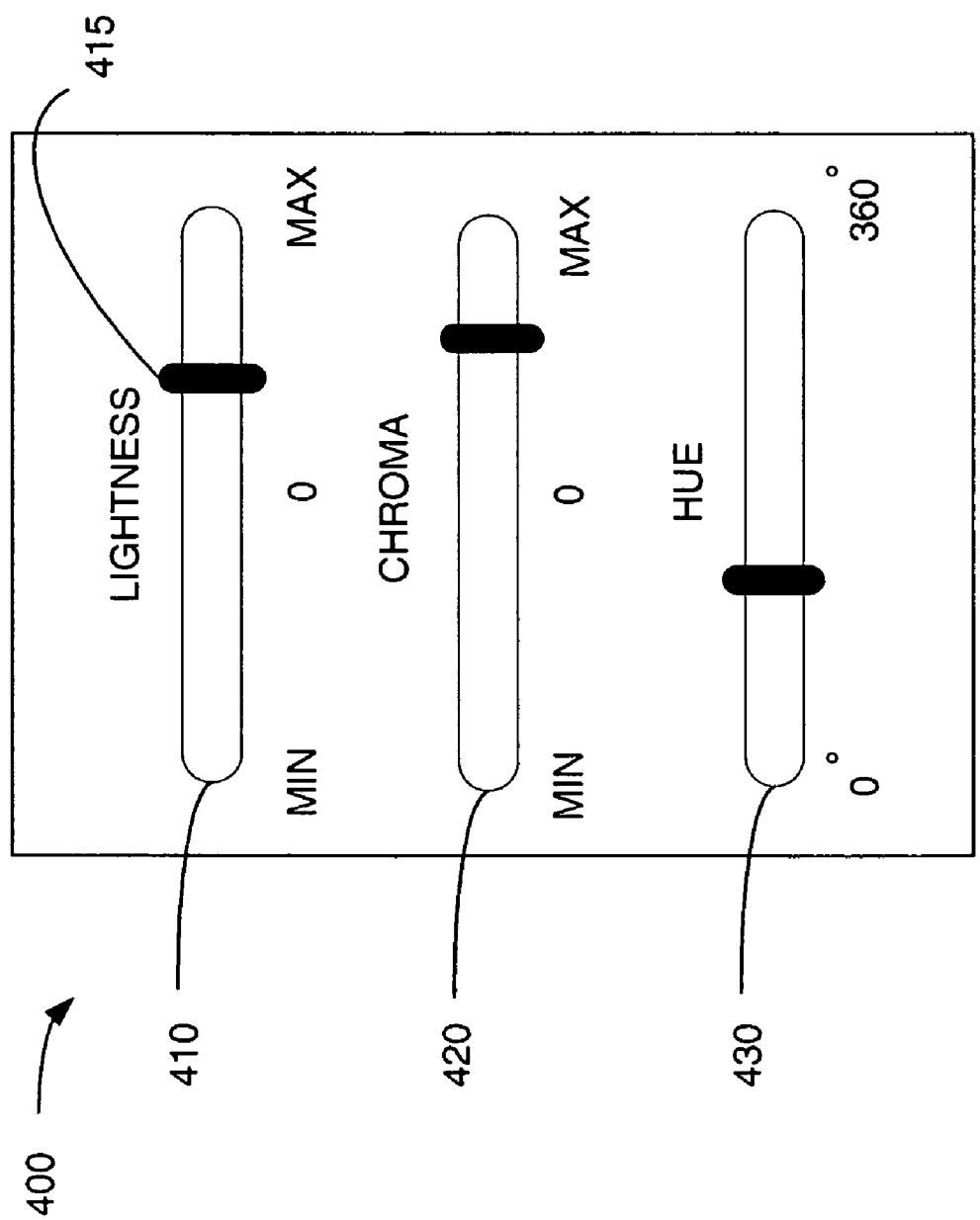

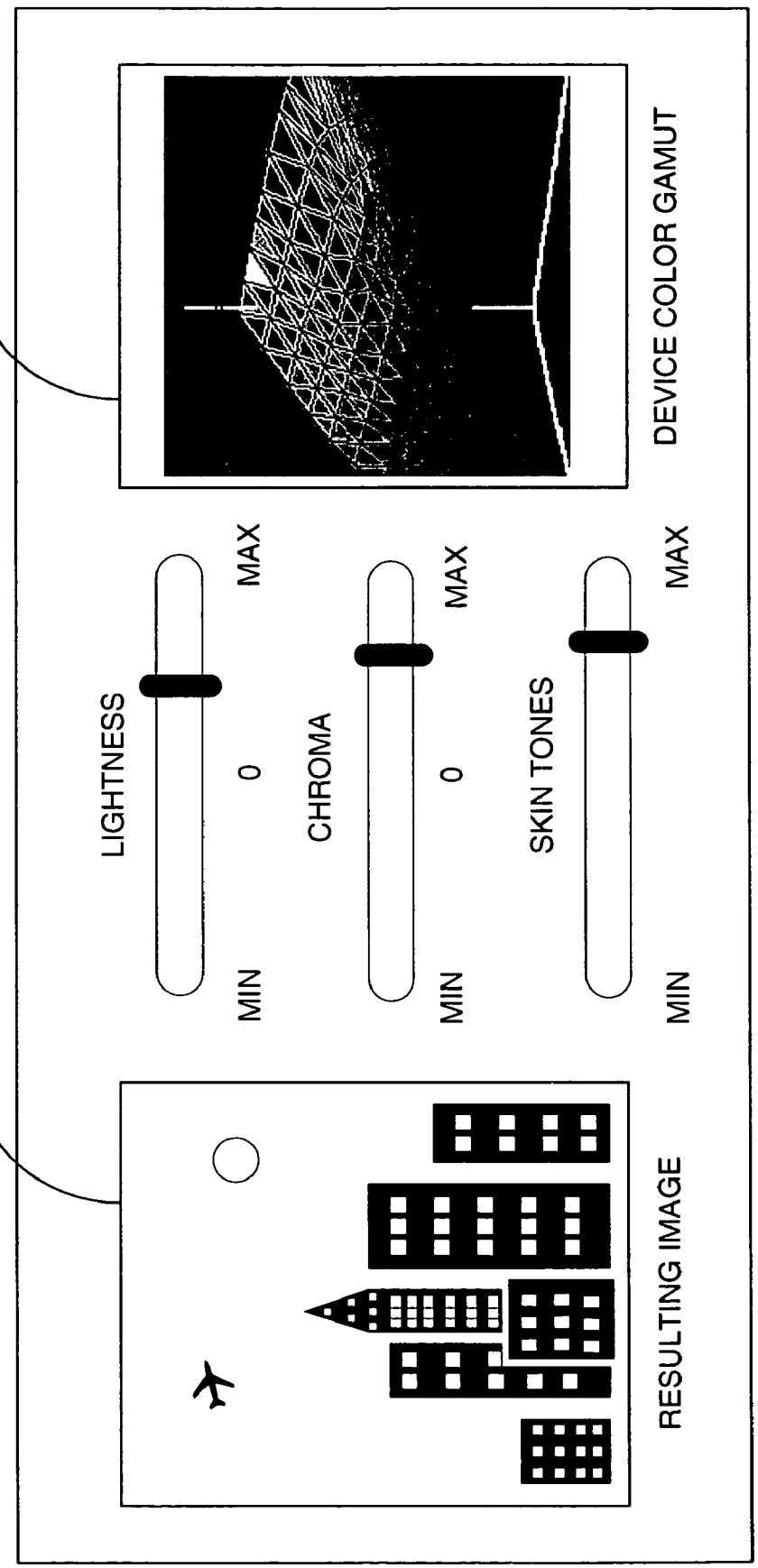

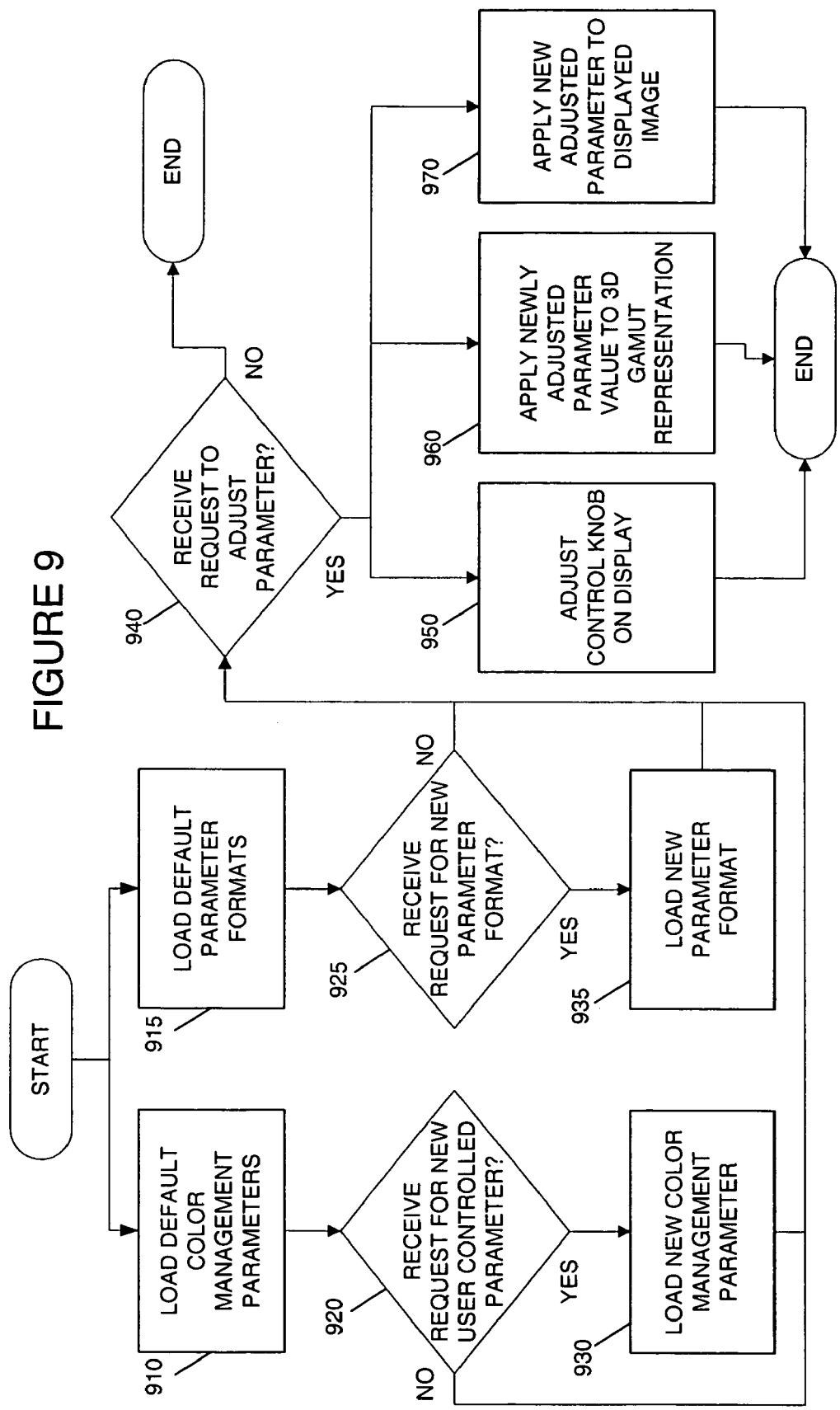

SYSTEM AND METHOD FOR DYNAMICALLY CONTROLLING GAMUT MAPPING FUNCTIONS

FIELD OF THE INVENTION

Aspects of the present invention are directed generally to color management systems. More particularly, aspects of the present invention are directed to a system and method for controlling gamut mapping algorithm parameters for user specific control in color management operations.

BACKGROUND OF THE INVENTION

User specific options and customization of products continues to be of increasing importance in the art of color management technology. Color management is the process of ensuring that color recorded by one device is represented as faithfully as possible to the human eye on a different device. The sensor of an imaging device will have, when compared to the human eye, a limited ability to capture all the color and dynamic range that the human eye can. The same problem occurs on both display devices and output devices. The problem is that while each of imaging, input and output devices have these color and dynamic range limitations, none of them will have limitations in exactly the same way. Therefore conversion rules must be set up to preserve as much of the already limited color and dynamic range information as possible, as well as ensure that the information appears as realistic as possible to the human eye, as it moves through the workflow.

With the differences between source and destination color spaces, colors that are present in the source color space which are not reproducible in the destination color space are referred to as out-of-gamut colors. In response to these out-of-gamut colors, the International Color Consortium (ICC) developed a profile specification that includes four different methods for processing out-of-gamut colors. A method for processing out-of-gamut colors is commonly known by one skilled in the art as a rendering intent or a gamut mapping algorithm. The four ICC profile specification rendering intents are 1) perceptual, 2) saturation, 3) relative colorimetric, and 4) absolute colorimetric. A perceptual rendering intent seeks to preserve the overall appearance of the image. A saturation rendering intent seeks to produce vivid colors and is often utilized for business graphics scenarios. A relative colorimetric rendering intent seeks accurate reproduction, relative to a white point. An absolute colorimetric rendering intent seeks a measurement accurate appearance. A detailed explanation of each type of rendering intent can be found on pages 88-92 of Fraser et al., *Real World Color Management*, Peachpit Press, Berkeley, Calif., 2003.

Most advanced or profile based color management solutions are based on the ICC profile specification. The ICC profile specification includes broad, textual definitions for the different rendering intents. However, the rendering intents of the ICC profile specification do not include reference limitations. Further, the ICC rendering intents are not based upon any mathematical equations. As such, a vendor interprets and implements the rendering intents differently. For example, various vendor applications can perform a perceptual rendering intent. Yet, the resulting appearance of an image will be different for each application since each vendor application can perform a perceptual rendering intent as the vendor so chooses. Such a specification of rendering intents lacks uniformity between various vendors.

Another consequence of the ICC profile specification is the effect on subjective solutions that a user may wish to apply to his/her workflow. The ICC profile specification combines objective intra-device measurements with the subjective inter-device gamut mapping functions. As such, a user cannot apply his/her subjective solutions in an efficient and/or interactive manner. Vendors have begun to include profiling tools for allowing a user to control certain parameters of a rendering intent or gamut mapping algorithm. The MonacoPROFILER 4.5 by Monaco Systems, Inc. of Andover, Mass. and the Heidelberg PrintOpen 4.5 by Heidelberg USA, Inc. of Kennesaw, Ga. are two examples of such a profiling tool. A user has limited and confined parameters that can be changed. The parameters are limited to certain parameters, such as the contrast or saturation of the colors, and the parameters are confined, i.e., a user cannot change the actual parameters to be controlled. A user cannot construct user interface elements to control parameters in a desired format. If the vendor provides a contrast user interface element, the user is confined to a linear input for the contrast parameter from a minimum value to a maximum value. A user cannot change the form of the contrast, such as a non-linear input, e.g., exponential input.

Conventional color management applications require a user to build and save a profile before applying it to an image. A user must exit a color management application prior to applying his/her parameter choices to an image. If the resulting image is not the desired resulting image, a user must enter the color management application again, apply new settings to the corresponding parameter, exit the application and apply the parameter choices to the image again. A user is left to guess and hope that his/her parameter choices, when applied to an input image, will provide a desired resulting image. A user cannot see a multi-dimensional representation of the source and destination device color gamuts in order to allow for easier, more efficient control over color management functions.

SUMMARY OF THE INVENTION

There is therefore a need for a color management system that allows a user to have more control over color management functions. An aspect of the present invention provides an architecture that enables a user to define color management controls over a certain parameter as designated by the user. The architecture takes parameter inputs from a user and applies them dynamically, in a gamut mapping algorithm, to process an image in a user interface. A user can apply a particular format, such as linear, non-linear, or polar coordinate, to the control function of the parameter as well.

Another aspect of the invention provides for display of the image being processed by the color management operations in a user interface. A user can see the effect of adjustments made to color mapping algorithm parameter elements dynamically on a display. Adjustments to color mapping algorithm parameter elements can be made without having to exit the user interface. Still another aspect of the invention provides for multi-dimensional representations of device color gamuts for the source and/or destination devices. Display of a multi-dimensional representation allows a user to see the effect that adjustments make to the color gamut and even modify the multi-dimensional representation itself.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIGS. 4-8 are graphical representations of a user interface for controlling color management parameters in accordance with at least one aspect of the present invention; and FIG. 9 is a flowchart of an illustrative embodiment of the steps for user specific control over color management parameters according to at least one aspect of the present invention.

DETAILED DESCRIPTION OF ILLUSTRATIVE EMBODIMENTS

In the following description of various illustrative embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Color management processing systems typically progress through the following components. Intra-device objective measurements are taken by an input device, such as an image with measured colors by a digital camera. This source input device has a predefined device color gamut. A color appearance model (CAM) is applied to the measured values. Next, an inter-device subjective transform is performed by a rendering intent, i.e., a gamut mapping algorithm. An inverse CAM is applied and the color information is finally sent to a destination device.

Figure 1:
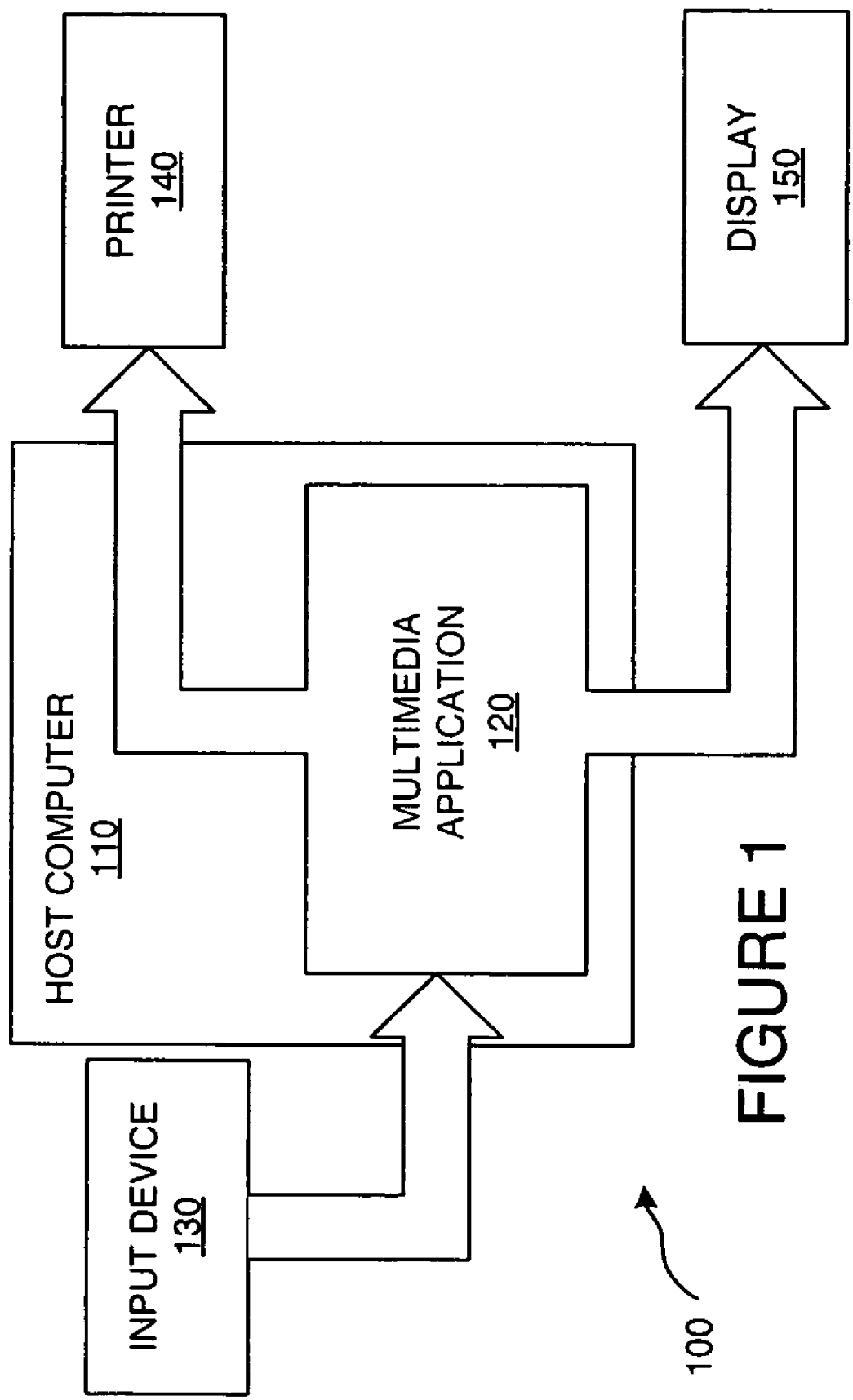
FIG. 1 is a block diagram of a color management solution including a display, host computer, and printer.

FIG. 1 shows a block diagram of a color management solution 100. FIG. 1 shows a host computer 110 that includes a multimedia application 120. The host computer 110 is coupled to an input device 130, printer 140, and a display 150. Input color object data from the input device 130 is processed through the multimedia application 120 and outputted to a printer 140. Under the color management solution 100, a user of the system, can control color management parameters of an image of input device 130. However, under the color management solution 100, the user does not have control over which color management functions are controlled or in what manner they are controlled. A vendor multimedia application 120 may provide for changes to the saturation and/or contrast of colors in an image; however, the multimedia application 120 does not allow a user to determine which color management parameter functions to control, nor does the multimedia application allow a user to specify the format of the color management parameter control.

Figure 2:
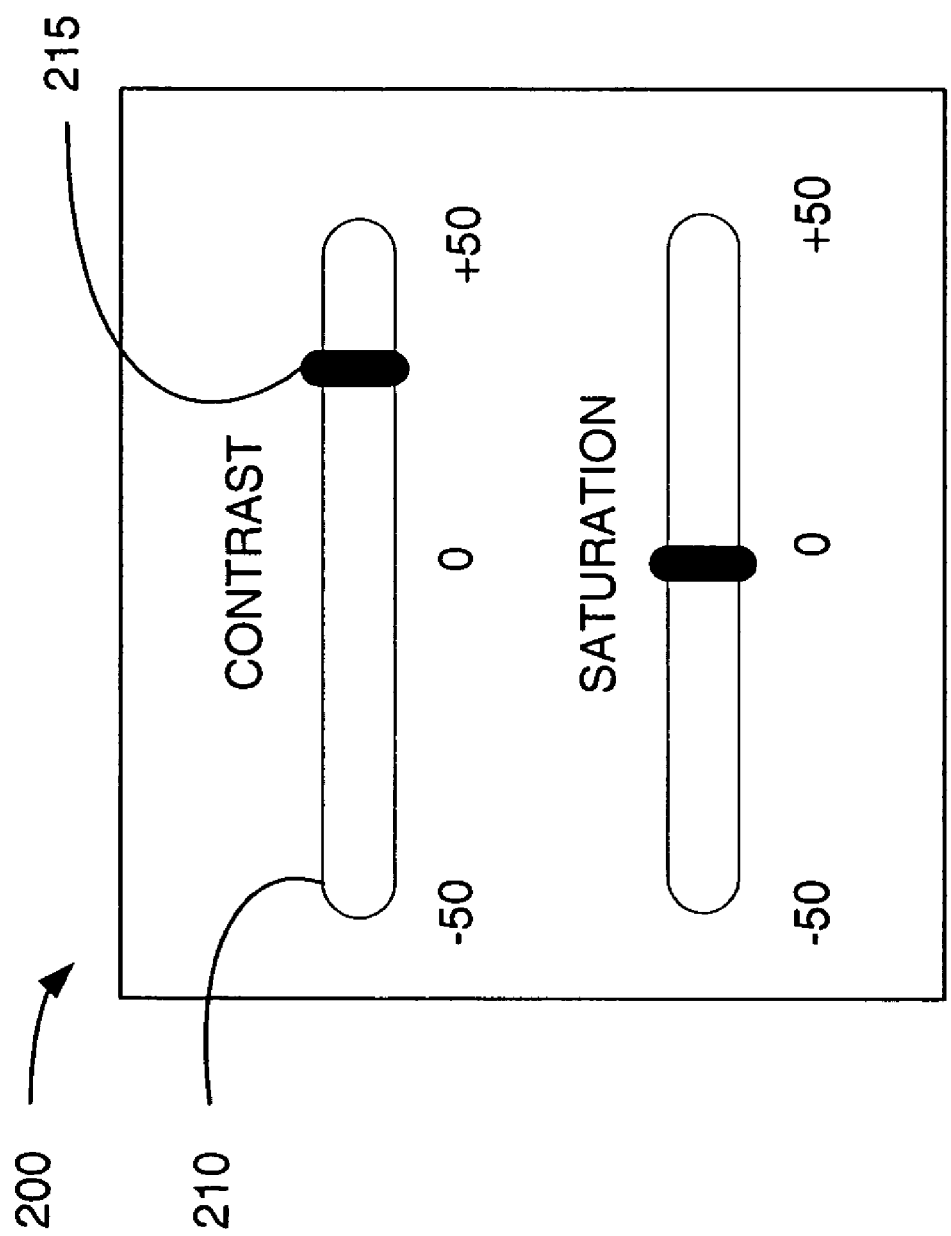
FIG. 2 is a graphical representation of a user interface of rendering controls for a color management solution.

FIG. 2 illustrates an example of a user interface 200 for control of rendering intent parameters. User interface 200 may be the multimedia application 120 illustrated in FIG. 1. The MonacoPROFILER 4.5 by Monaco Systems, Inc. of Andover, Mass. is one example of such a user interface 200. The user interface 200 includes two slide bar type control knobs for adjustment of predefined parameters of color management. User interface 200 shows a slide bar type control knob 210 for controlling the contrast function applied to colors during color management processing. Slide bar type control knob 210 includes a positioning point 215. A user can move an input device, such as a computer mouse, to click and drag the positioning point 215 to a desired level for controlling the contrast function applied during color management. Slide bar type control bar 210 includes a scale with a minimum value and maximum value. Slide bar type control knob 210 is a linear based control scale. A user can only control the adjustment of slide bar type control knob 210 based upon the linear based format developed by the vendor.

Figure 3A:
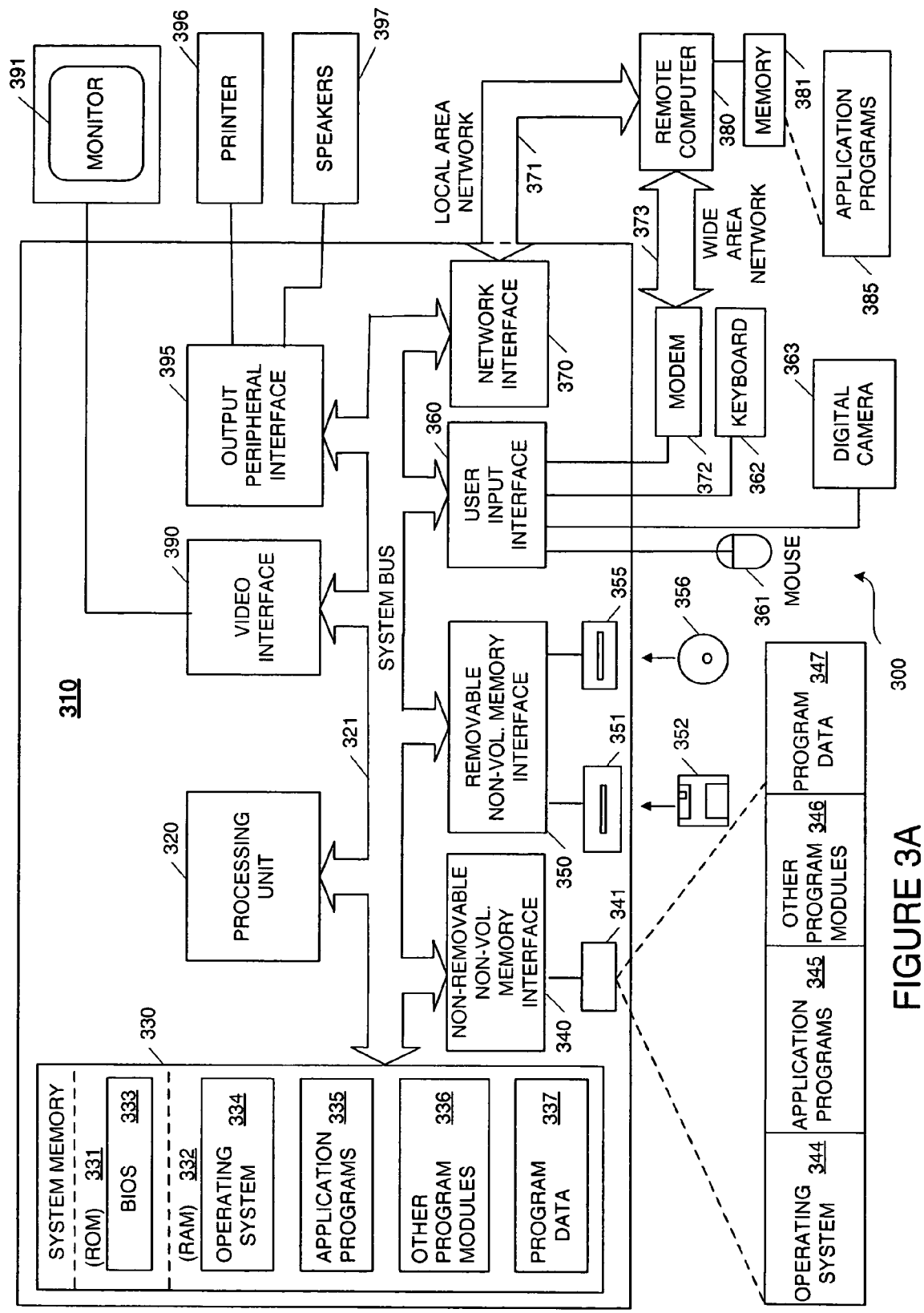
FIG. 3A illustrates a schematic diagram of a general-purpose digital computing environment in which certain aspects of the present invention may be implemented.

FIG. 3A illustrates an example of a suitable computing system environment 300 on which the invention may be implemented. The computing system environment 300 is only one example of a suitable computing environment and is not intended to suggest any limitation as to the scope of use or functionality of the invention. Neither should the computing system environment 300 be interpreted as having any dependency or requirement relating to any one or combination of components illustrated in the exemplary computing system environment 300.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 3A, an exemplary system for implementing the invention includes a general-purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as ROM 331 and RAM 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3A illustrates operating system 334, application programs 335, other program modules 336, and program data 337.

The computer 310 may also include other removable/non-removable, volatile/nonvolatile computer storage media. By way of example only, FIG. 3A illustrates a hard disk drive 341 that reads from or writes to non-removable, nonvolatile magnetic media, a magnetic disk drive 351 that reads from or writes to a removable, nonvolatile magnetic disk 352, and an optical disc drive 355 that reads from or writes to a removable, nonvolatile optical disc 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disc drive 355 are typically connected to the system bus 321 by a removable memory interface, such as interface 350.

The drives and their associated computer storage media discussed above and illustrated in FIG. 3A, provide storage of computer readable instructions, data structures, program modules and other data for the computer 310. In FIG. 3A, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as a digital camera 363, a keyboard 362, and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus 321, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3A. The logical connections depicted in FIG. 3A include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3A illustrates remote application programs 385 as residing on memory device 381. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, or protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or in a combination of hardware and software.

Figure 3C:
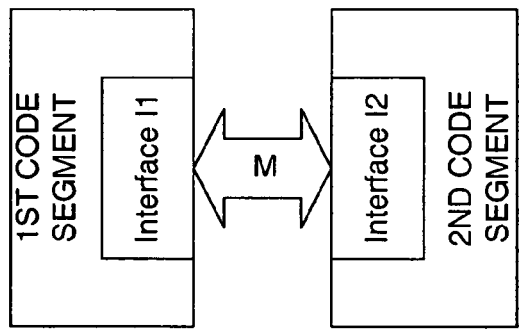
FIGS. 3B through 3M show a general-purpose computer environment supporting one or more aspects of the present invention.
Figure 3E:
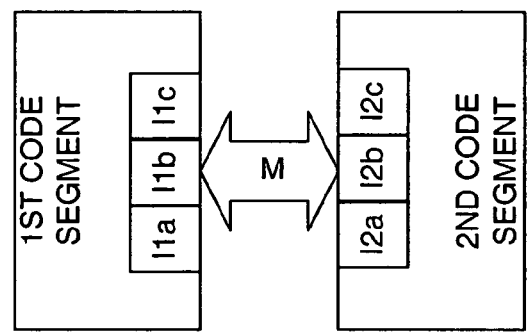
Figure 3B:
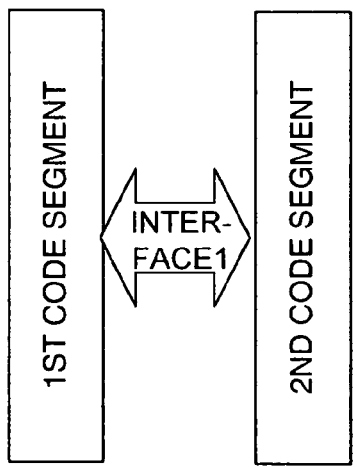

Notionally, a programming interface may be viewed generically, as shown in FIG. 3B or FIG. 3C. FIG. 3B illustrates an interface Interface1 as a conduit through which first and second code segments communicate. FIG. 3C illustrates an interface as comprising interface objects I1 and I2 (which may or may not be part of the first and second code segments), which enable first and second code segments of a system to communicate via medium M. In the view of FIG. 3C, one may consider interface objects I1 and I2 as separate interfaces of the same system and one may also consider that objects I1 and I2 plus medium M comprise the interface. Although FIGS. 3B and 3C show bidirectional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 3B and 3C, but they nonetheless perform a similar function to accomplish the same overall result. We will now briefly describe some illustrative alternative implementations of a programming interface.

A. Factoring

Figure 3D:
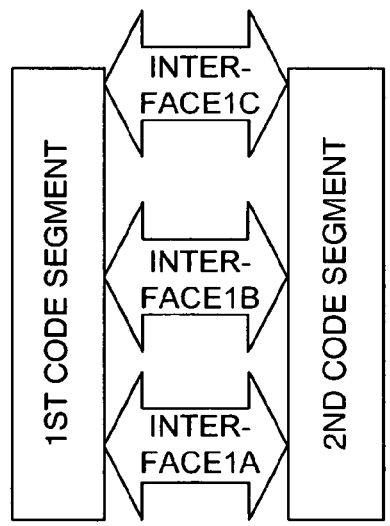

A communication from one code segment to another may be accomplished indirectly by breaking the communication into multiple discrete communications. This is depicted schematically in FIGS. 3D and 3E. As shown, some interfaces can be described in terms of divisible sets of functionality. Thus, the interface functionality of FIGS. 3B and 3C may be factored to achieve the same result, just as one may mathematically provide 24, or 2 times 2 times 3 times 2. Accordingly, as illustrated in FIG. 3D, the function provided by interface Interface1 may be subdivided to convert the communications of the interface into multiple interfaces Interface1A, Interface1B, Interface1C, etc. while achieving the same result. As illustrated in FIG. 3E, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the 1st code segment need not match the number of interfaces included with the 2nd code segment. In either of the cases of FIGS. 3D and 3E, the functional spirit of interfaces Interface1 and I1 remain the same as with FIGS. 3B and 3C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 3G:
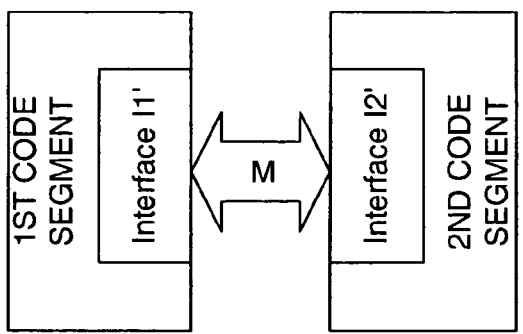
Figure 3I:
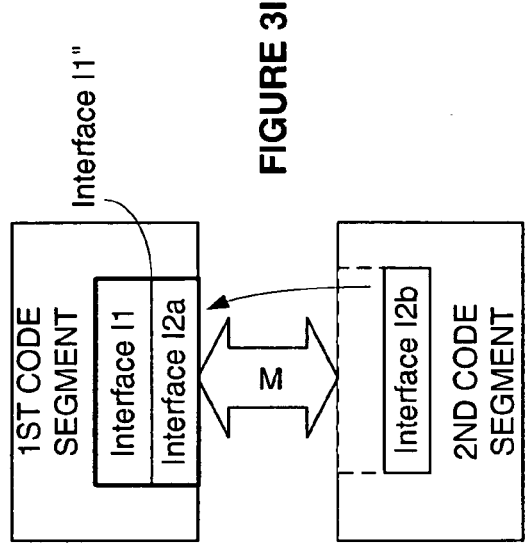
Figure 3F:
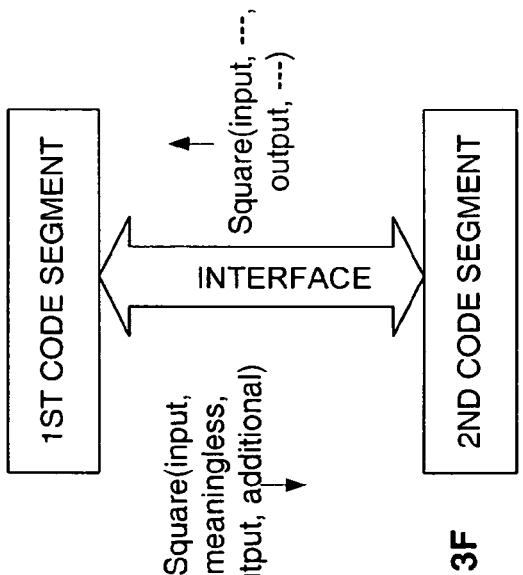

In some cases, it may be possible to ignore, add or redefine certain aspects (e.g., parameters) of a programming interface while still accomplishing the intended result. This is illustrated in FIGS. 3F and 3G. For example, assume interface Interface1 of FIG. 3B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 3F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 3G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 3H:
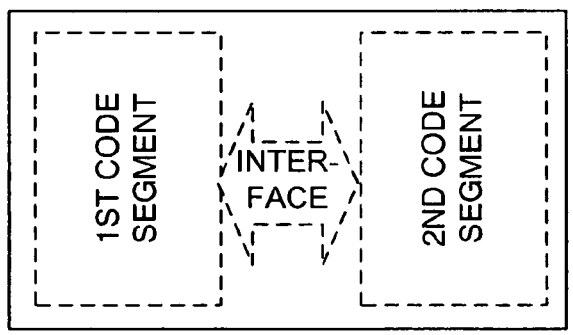

It may also be feasible to merge some or all of the functionality of two separate code modules such that the "interface" between them changes form. For example, the functionality of FIGS. 3B and 3C may be converted to the functionality of FIGS. 3H and 3I, respectively. In FIG. 3H, the previous 1st and 2nd Code Segments of FIG. 3B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 3I, part (or all) of interface I2 from FIG. 3C may be written inline into interface I1 to form interface I1". As illustrated, interface I2 is divided into I2a and I2b, and interface portion I2a has been coded in-line with interface I1 to form interface I2". For a concrete example, consider that the interface I1 from FIG. 3C performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 3K:
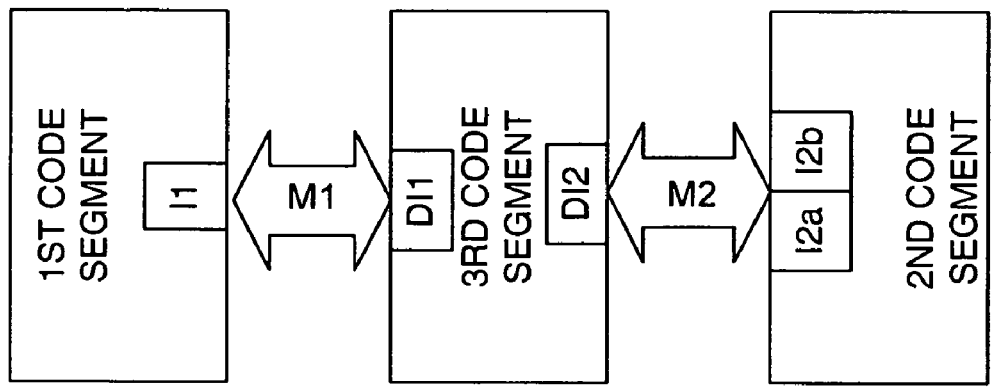
Figure 3J:
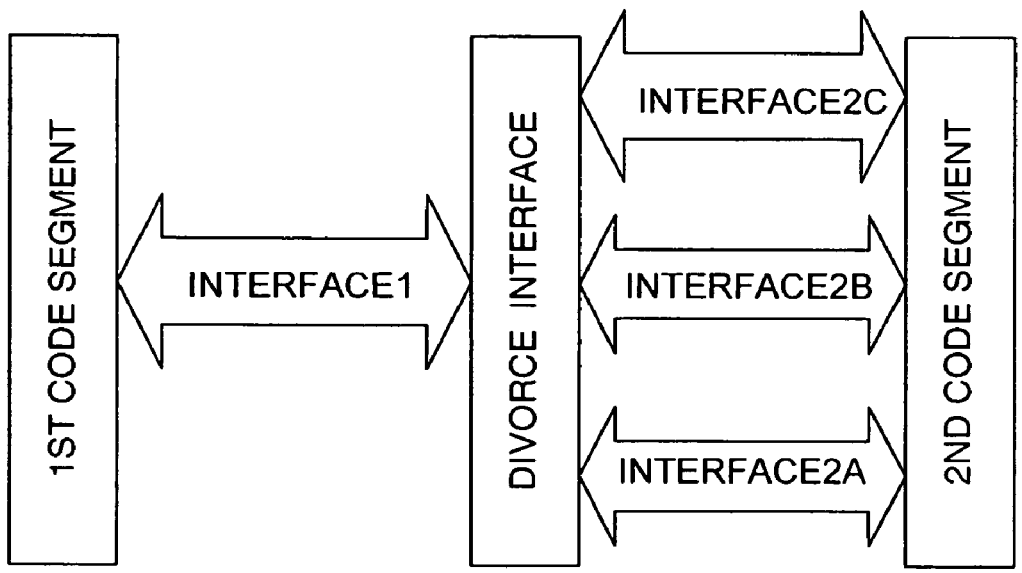

A communication from one code segment to another may be accomplished indirectly by breaking the communication into multiple discrete communications. This is depicted schematically in FIGS. 3J and 3K. As shown in FIG. 3J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 3K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 3C to a new operating system, while providing the same or similar functional result.

E. Rewriting

Figure 3L:
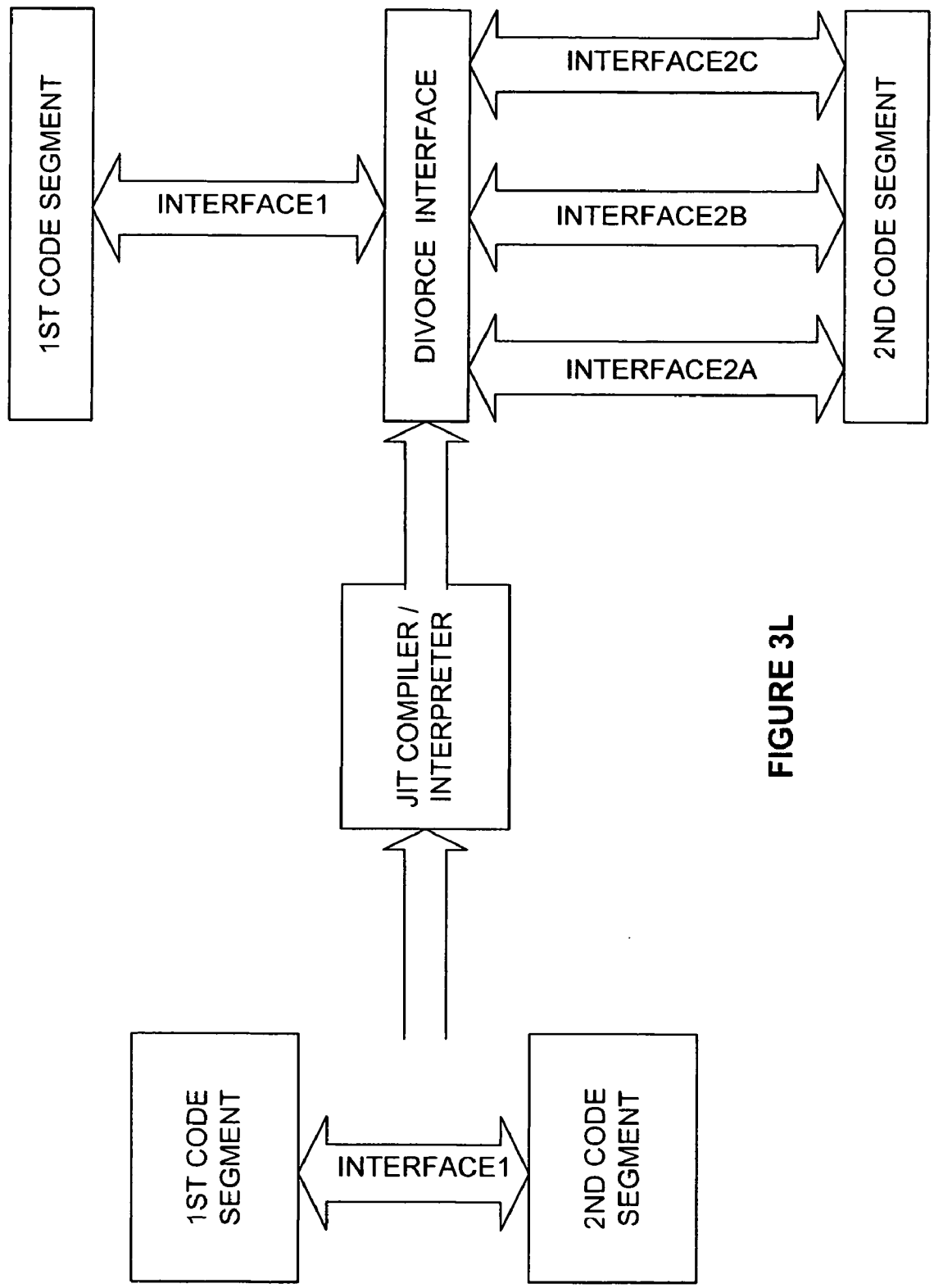
Figure 3M:
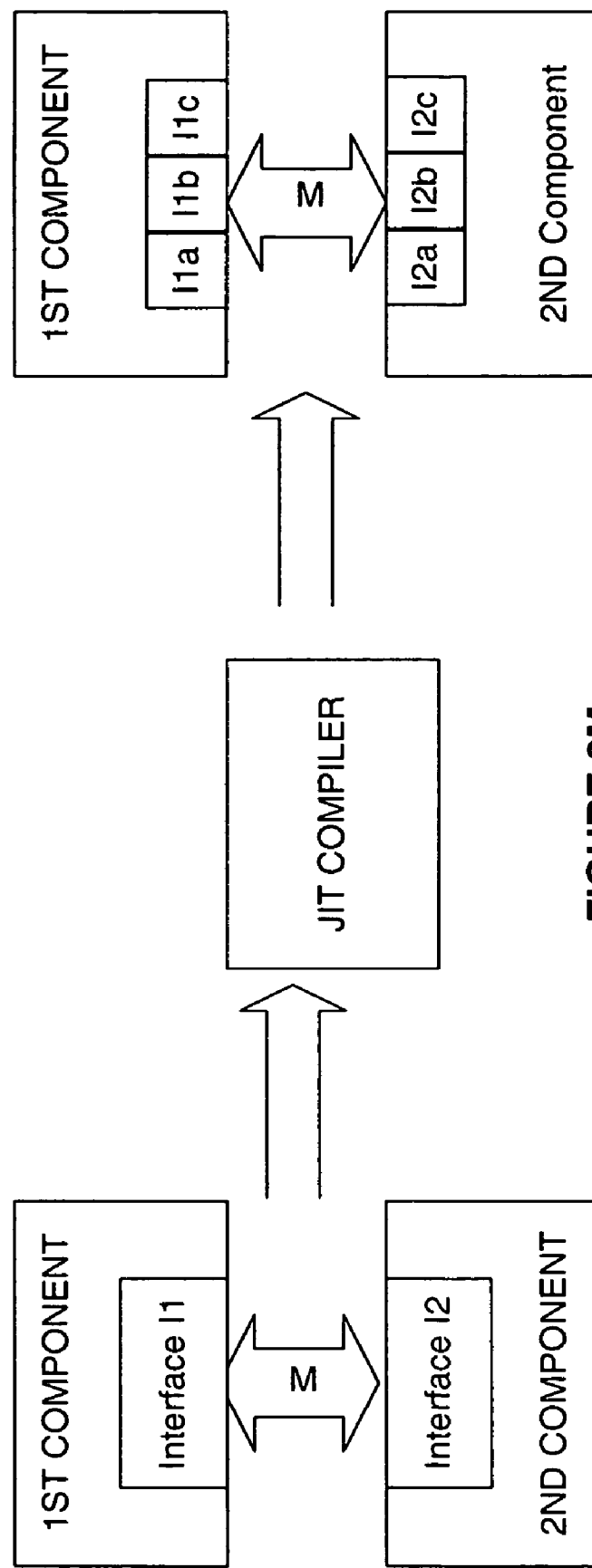

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 3L and 3M. As can be seen in FIG. 3L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 3M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 3B and 3C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

FIG. 4 shows an illustrative user interface 400 in accordance with at least one aspect of the present invention. User interface 400 displays parameters that a user can adjust to a specific level and in a user specific format. As shown in FIG. 4, slide bar type control knobs 410, 420, and 430 are shown. Slide bar type control knob 410 allows a user to adjust the lightness of colors in an image during color management processing. As shown, slide bar type control knob 410 includes a positioning point 415. A user can move an input device, such as the computer mouse 361 shown in FIG. 3A, to click and drag the positioning point 415 to a desired level for controlling the lightness function applied during color management processing. Slide bar type control bar 410 includes a scale with a minimum value and maximum value. Slide bar type control knob 420 allows a user to adjust the chroma of colors in an image during color management processing. Similar to slide bar type control knob 410, slide bar type control knob 420 includes a scale with a minimum value and a maximum value. Slide bar type control knob 430 allows a user to adjust the hue of colors in an image during color management processing. Similar to slide bar type control knobs 410 and 420, slide bar type control knob 430 includes a linear based scale. However, slide bar type control knob 430 is scaled based upon degrees from 0° to 360°. User interface 400 may be a set of parameter functions, e.g., lightness, chroma, and hue, which is a default configuration. Alternatively, user interface 400 may be a set of parameter functions that has been specifically designed by the user.

Figure 5:
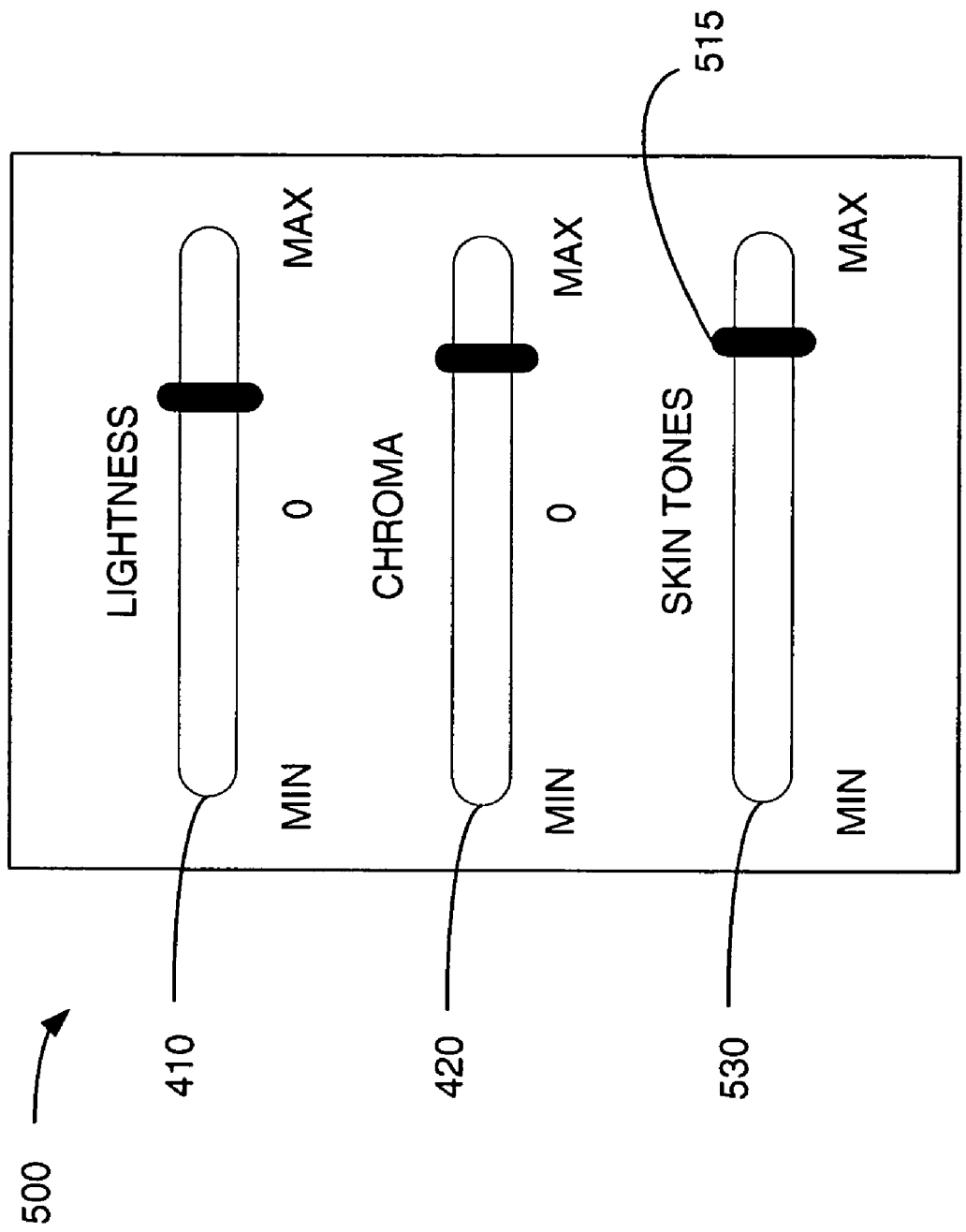

According to at least one aspect of the present invention, a user can determine which gamut mapping functions to control during the color management processing of an input image. A user is not confined to a particular set of parameters established by a vendor. For example, a user can change a set of parameter functions, such as those shown in FIG. 4. As shown in FIG. 5, user interface 500 includes a new color management parameter identified as "SKIN TONES". In this example, the "SKIN TONES" parameter may be a function where a user desires that particular skin tone colors change differently than other colors in an input image for color management processing. The new color management parameter can be adjusted by a user by way of a slide bar type control knob 530. Slide bar type control knob 530 includes a positioning point 515 which a user can click and drag to a desired level. As shown, the new color management parameter is shown along a scale with a minimum value and a maximum value.

Not only can a user control which particular color management parameters can be controlled during color management processing, but a user can also establish the format for input of the desired level of the parameter. As used herein, the term "gamut mapping algorithm parameter element" is defined to in what the actual parameter is, e.g., saturation, hue, as well as the format of the parameter, e.g., a linear based scale, an exponential based scale. A "gamut mapping algorithm parameter element" does not include a value of a gamut mapping algorithm parameter.

As shown in FIG. 5, the minimum value and maximum value of the slide bar type control knob 530 may be a non-linear based scale, such as an exponentially changing format. Therefore, a user can determine which color management parameters to control during color management processing of an image, and the user can also choose the format of the input control for any color management parameter. It should be understood by those skilled in the art that a slide bar type control knob is but one type of adjustable control system and that other types of adjustable control systems may be included. Any number of control knobs and different types of control knobs can be included within a user interface. Further, it should be understood by one skilled in the art that a number of different types of formats of the input control for a color management parameter may be used and/or offered as an option to a user when constructing a user interface specifically configured to the desires of a user. For example, input parameters may be shown in polar coordinates, retrolinear coordinates, on an exponential scale, on a logarithmic scale, or in any other of a number of different types of formats.

Also, it should be understood by one skilled in the art that any type of parameter may be chosen by a user for use as an adjustable parameter during color management processing. For example, a user may construct a parameter that specifically controls changes to blue colors, saturation of only red colors, and/or contrast of only green colors. The present invention parameterizes a gamut mapping algorithm and exposes those parameters as user interface elements to allow users to interactively control them. The architecture of the present invention may include an interface description language (IDL) for coding a gamut mapping algorithm to parameterize elements of the color management process. The architecture allows a user to define specific functions to be controlled. A user has the ability to control any function of the gamut mapping algorithm of a color management processing system.

Figure 6:
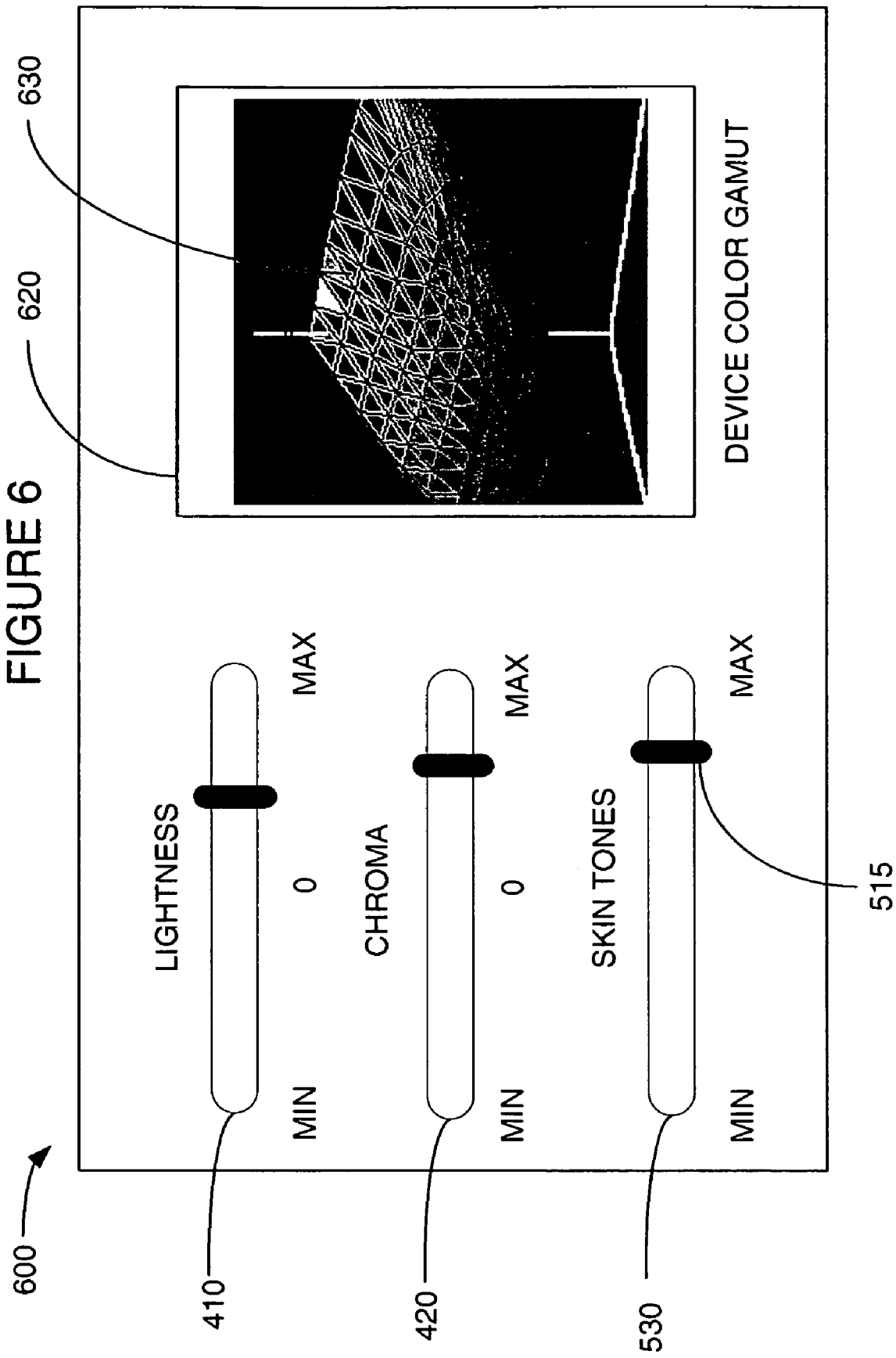

FIG. 6 illustrates another user interface 600 in accordance with at least one aspect of the present invention. As shown, user interface 600 includes a number of slide bar type control knobs 410, 420, and 530 for adjusting specific, user-defined parameters. Each slide bar type control knob, such as control knob 530, includes a positioning point, such as positioning point 515, which can be adjusted by a user to a desired level. Further, each slide bar type control knob includes a scale for adjustment purposes. For example, control knob 530 includes a scale from a minimum value to a maximum value. User interface 600 also includes a three-dimensional (3D) graphical representation 620 of a source or destination device color gamut. With the 3D representation 620 of the source or destination device color gamut, a user can adjust a slide bar type control knob, such as the lightness control knob 410, and see the effect on the 3D representation 620. Alternatively, or in addition, a user can modify a portion 630 of the 3D representation 620 itself to achieve the desired user specified gamut mapping result.

Figure 7:
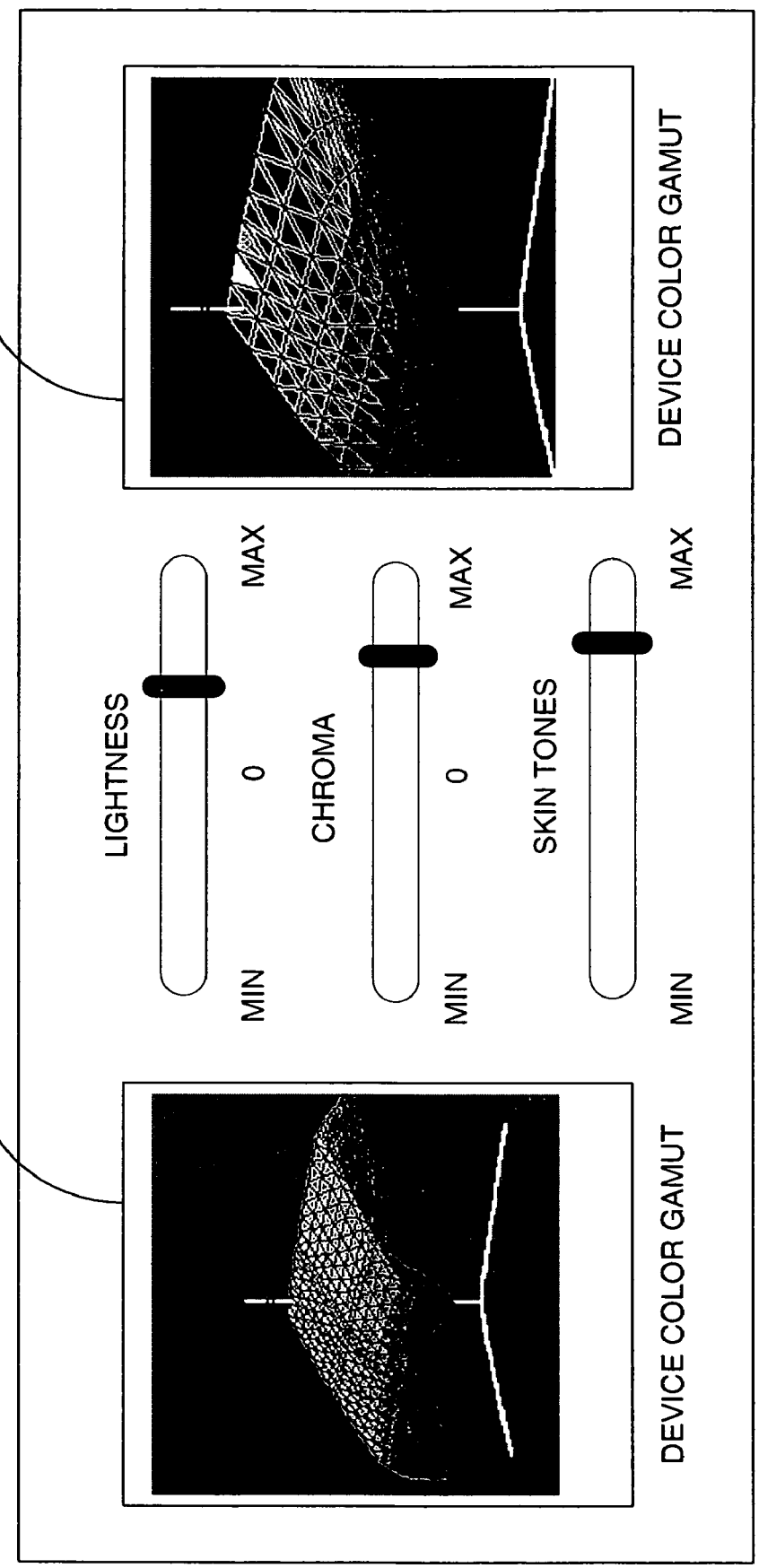

FIG. 7 illustrates a user interface 700 in accordance with at least one aspect of the present invention. Similar to the slide bar type control knob shown in FIG. 6, FIG. 7 includes three slide bar type control knobs. User interface 700 also includes a 3D graphical representation 620, which in this figure corresponds to a destination device color gamut. In addition, user interface 700 includes a 3D graphical representation 720 of a source device color gamut. In this example, a user can see the source device color gamut as a 3D representation 720 that can be modified by the user. The slide bar type control knobs can be constructed to control functions at the source device side and/or control functions at the destination device side. Therefore, a user has more customizable control over what parameters are controlled, what format they are controlled in, and which device will perform the color management operation associated with the parameter during the color management processing of an image. Some operations can be specified to be modified by the source device and other operations can be specified to be modified by the destination device. Similar to 3D representation 620, 3D representation 720 of the source device color gamut can be modified directly by a user.

FIG. 8 illustrates an example of a user interface 800 in accordance with at least one aspect of the present invention. User interface 800 is similar to user interface 600. User interface 800 also includes a resulting image thumbnail 820 of the input image that is being processed through the color management processing system. With user interface 800, a user can adjust parameters via control knobs and/or directly on a 3D representation 620 and then see the resulting image as a thumbnail 820. In this manner, a user can perform color management operations on an input image and see the resulting image as a thumbnail 820 in order to determine whether further adjustments are needed for color management processing. As such, a user can perform color management operations on an input image without having to build a profile in an application program, exit the application program for changing a parameter, test the result and then start the process again if the resulting image was not the desired resulting image. With user interface 800, a user can make color management adjustments dynamically without having to exit and reenter the application operating with the color management processing operations. It should be understood by one skilled in the art that legacy equipment may require an API specifically designed for operation with the legacy equipment for implementation of any of these user interface components.

FIG. 9 shows a flowchart illustrating the steps for user specific control over color management parameters according to an exemplary implementation of the present invention, which can operate in conjunction with the computer graphics processing system 301 described in FIG. 3A. At step 910, default color management parameters are loaded into a user interface. These default parameters may include control knobs for adjusting lightness, chroma, and hue. Concurrently, at step 915, default parameter formats are loaded into a user interface. These default parameter formats may all be linear based scales from a minimum value to a maximum value. At step 920, a determination is made as to whether a request has been received for a new user controlled parameter to be loaded into the user interface. If a request is received for a new user controlled parameter to be loaded into the user interface, at step 930, the new color management parameter is loaded into the user interface and the process continues at step 940. Alternatively, if no request is received for a new user controlled parameter to be loaded into the user interface, the process continues at step 940. It should be understood by one skilled in the art that step 915 does not have to occur concurrently with step 910 and that this is but one example process.

Concurrently with step 920, at step 925, a determination is made as to whether a request has been received for a new parameter format to be applied to a particular parameter in the user interface. If a request is received for a new parameter format to be applied to a particular parameter in the user interface, at step 935, the new parameter format applied to a particular parameter is loaded into the user interface and the process continues at step 940. Alternatively, if no request is received for a new parameter format to be applied to a particular parameter in the user interface, the process continues at step 940. It should be understood by one skilled in the art that step 925 does not have to occur concurrently with step 920 and that this is but one example process.

At step 940, another determination is made as to whether a request has been received to adjust a particular parameter within the user interface. If no request is received to adjust a particular parameter within the user interface, the process ends. If a request is received to adjust a particular parameter within the user interface, one or more of the following steps are performed. At step 950, the corresponding control knob that has been adjusted is adjusted on the display of the user interface. For example, if the positioning point has been moved to a minimum value or a maximum value, its position on the scale is adjusted in comparison to the level chosen by the user. At step 960, the newly adjusted parameter value is applied to a 3D representation of a source or destination device color gamut. At step 970, the newly adjusted parameter value is applied to the displayed image thumbnail, such as displayed image thumbnail 820 shown in FIG. 8.

Operation of any of the above described user interface elements and processing of a color mapping algorithm can occur in one of three different manners. First, processing of a color mapping algorithm can occur in a sequential manner. In this type of operation, every pixel that comes into the color mapping algorithm is processed and sent out of the color mapping algorithm. This type of operation is an algorithmic operation. Second, processing of a color mapping algorithm can occur by building a profile and building a transform to create a final table from the algorithms each time that a change occurs in the color management process, e.g., a user changes a parameter input value. Third, a delta is applied to the gamut mapping algorithm process. In this manner, a baseline transform is built and a baseline gamut mapping algorithm is built. A delta is computed between the baseline transform and baseline gamut mapping algorithm. Then, a look up table built before the gamut mapping algorithm and a look up table built after the gamut mapping algorithm are concatenated with the delta for all color management processing.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. Further, the examples illustrated in the Figures identify a digital camera. It should be understood by those skilled in the art that a digital camera is a type of an image capturing device and that the present invention is not so limited to a digital camera. It will also be appreciated and understood that modifications may be made without departing from the true spirit and scope of the present invention. The description is thus to be regarded as illustrative instead of restrictive on the present invention.

We claim:

1. A method, performed in a computing device, for controlling a gamut mapping algorithm parameter, the method comprising steps of:

receiving input from a user including a request to add and/or delete a gamut mapping algorithm parameter element;

defining a modified gamut mapping algorithm parameter element responsive to said request;

receiving a request to adjust the modified gamut mapping algorithm parameter element; and adjusting a color management operation for processing an input image in response to said request to adjust.

2. The method of claim 1, wherein the request to add and/or delete is a request to replace a pre-existing gamut mapping algorithm parameter element with the modified gamut mapping algorithm parameter element.

3. The method of claim 1, wherein the modified gamut mapping algorithm parameter element is at least one of: lightness, chroma, and hue.

4. The method of claim 1, wherein the gamut mapping algorithm parameter element is a format of a corresponding gamut mapping algorithm parameter.

5. The method of claim 4, wherein the format is a non-linear based format.

6. The method of claim 1, wherein the request to adjust is a request to adjust a format of the gamut mapping algorithm parameter between a user defined minimum value and a user defined maximum value.

7. The method of claim 6, wherein the format is a non-linear based format.

8. The method of claim 1, wherein the step of adjusting a color management operation is based upon the request to adjust the modified gamut mapping algorithm parameter element and at least one of a source device color gamut and a destination device color gamut.

9. The method of claim 1, further comprising a step of displaying the input image, wherein the input image is configured to be dynamically adjusted responsive to the request to adjust the modified gamut mapping algorithm parameter element.

10. The method of claim 1, further comprising a step of displaying at least one multi-dimensional color gamut representation of at least one of a source device and a destination device.

11. The method of claim 10, wherein the at least one multi-dimensional color gamut representation is configured to be modified by the request to add and/or delete.

12. The method of claim 1, further comprising a step of displaying an input image, wherein the input image is configured to be dynamically modified by the modified gamut mapping algorithm parameter element.

13. A method, performed in a computing device, for processing an input image via a gamut mapping algorithm parameter, the method comprising steps of:

receiving a request to add and/or delete a gamut mapping algorithm parameter element; and defining a modified gamut mapping algorithm parameter element responsive to said request;

displaying the modified gamut mapping algorithm parameter in a graphical user interface, wherein the modified gamut mapping algorithm parameter is adjustable; and displaying an input image in the graphical user interface, wherein the input image is configured to be dynamically modified in response to an adjustment to the adjustable modified gamut mapping algorithm parameter.

14. The method of claim 13, wherein the adjustable modified gamut mapping algorithm parameter is adjustable along a non-linear scale.

15. The method of claim 13, further comprising a step of displaying at least one multi-dimensional color gamut representation of at least one of: a source device and a destination device.

16. The method of claim 15, wherein the at least one multi-dimensional color gamut representation is configured to be modified by a request to modify the at least one multi-dimensional color gamut representation.

17. A computing system for controlling gamut mapping algorithm parameters, the system comprising:
   a graphical user interface including at least one gamut mapping algorithm parameter element; and
   a processing component configured to receive a request to add and/or delete at least one gamut mapping algorithm parameter element and to define a modified gamut mapping algorithm parameter element responsive to said request,
   wherein the modified gamut mapping algorithm parameter element is incorporated in the graphical user interface and is configured to be dynamically adjusted responsive to a request to adjust the modified gamut mapping algorithm parameter element.

18. The system of claim 17, wherein the at least one modified gamut mapping algorithm parameter element is at least one of lightness, chroma, and hue.

19. The system of claim 17, wherein the at least one modified gamut mapping algorithm parameter element is a format of a corresponding gamut mapping algorithm parameter.

20. The system of claim 19, wherein the format is a non-linear based format.

21. The system of claim 17, wherein the processing component is further configured to, upon receipt of the request to adjust the modified gamut mapping algorithm parameter element, adjust a color management operation for processing an input image in response to said request to adjust.

22. The system of claim 21, wherein the request to adjust is a request to adjust a value of the modified gamut mapping algorithm parameter between a user defined minimum value and a user defined maximum value.

23. The system of claim 21, wherein the processing component is further configured to display the input image, wherein the input image is configured to be dynamically adjusted by the request to adjust the modified gamut mapping algorithm parameter element.

24. The system of claim 23, wherein the processing component is further configured to display at least one multi-dimensional color gamut representation of at least one of a source device and a destination device.

25. The system of claim 17, wherein the processing component is further configured to display an input image, wherein the input image is configured to be dynamically modified by the modified gamut mapping algorithm parameter element.

26. A computer-readable medium storing computer-executable instructions for controlling a gamut mapping algorithm parameter, the method comprising steps of:
   receiving a request to add and/or delete a gamut mapping algorithm parameter element;
   defining a modified gamut mapping algorithm parameter element responsive to said request; and
   adjusting a color management operation for processing an input image in response to a request to adjust the modified gamut mapping algorithm parameter element.

27. The computer-readable medium of claim 26, further comprising step of: adjusting a color management operation for processing an input image in response to said request to adjust.

28. A computer-readable medium, storing instructions, executed by a processor, for controlling a gamut mapping algorithm parameter, comprising:
   at least one component configured to receive a request to add and/or delete a gamut mapping algorithm parameter element and to define a modified gamut mapping algorithm parameter element responsive to said request; and
   at least one application program interface to access The component,
   wherein The modified gamut mapping algorithm parameter element is incorporated in The application program interface and is configured to be dynamically adjusted responsive to a request to adjust the modified gamut mapping algorithm parameter element.

29. The software architecture of claim 28, wherein the at least one application program interface is configured to access the at least one component responsive to a request.

30. The method of claim 1, wherein a portion of the input image is processed based on the modified gamut mapping algorithm parameter element.

* * * * *